3,042,704
METHYL BORATE PROCESS

Charles Everett Hansen and Roland L. Hughes, Kansas City, Mo., assignors to Callery Chemical Company, Pittsburgh, Pa., a corporation of Pennsylvania
No Drawing. Filed Apr. 14, 1960, Ser. No. 22,130
8 Claims. (Cl. 260—462)

This invention relates to an improved process for producing methyl borate in which methyl borate is both recovered from methyl borate-methanol mixtures and produced from trimethoxyboroxine.

The recovery of methyl borate from its mixtures with methanol is a difficult problem in methyl borate manufacture. Processes by which methyl borate is prepared generally result in the production of the azeotrope of methyl borate and methanol. Thus, for example, methyl borate-methanol azeotrope is produced from the reaction of boric acid and methanol. Similar mixtures of methyl borate and methanol in which the proportion of methyl borate varies but is below that present in the azeotrope are obtained as by-products from several processes in which methyl borate is a reactant. Trimethoxyboroxine, $B_3O_3(OCH_3)_3$, is also obtained in large quantities as a by-product of certain processes in which other boron compounds are made. It is an important part of these processes to recover the boron values in the trimethoxyboroxine in order to reduce the cost of the compounds produced in those processes. Therefore, the production of methyl borate from trimethoxyboroxine and from methyl borate-methanol mixtures are each necessary in order to make these various processes economically feasible.

The broad object of this invention is to provide an improved process whereby methyl borate is simultaneously recovered from methanol-methyl borate mixtures and produced from trimethoxyboroxine. Another object is to provide such a method which is applicable to continuous production and to the production of methyl borate from trimethoxyboroxine on a relatively large scale. Still other objects will become apparent from time to time hereinafter.

The simultaneous recovery of methyl borate from methanol-methyl borate mixtures and trimethoxyboroxine is accomplished by a method set forth in the co-assigned application of Uchida and Williams, filed on the same day herewith. The process disclosed in that application comprises the reaction of trimethoxyboroxine with a methyl borate-methanol mixture whereby boric acid is produced, removing the boric acid and distilling the mixture to provide methyl borate from both the starting mixture used and trimethoxy-boroxine. This method is broadly applicable to methyl borate-methanol mixtures and provides an adequate and efficacious means for the recovery of methyl borate.

We have now discovered an improvement upon the above described method, whereby better yields, simpler operation, the elimination of certain steps and a process more adaptable to continuous production are achieved.

The improvement which forms the basis for our invention is predicated upon our discovery that distillation of the reaction mixture formed by the reaction of trimethoxyboroxine with a methyl borate-methanol mixture, when carried out at reduced pressures but without first removing the boric acid, produces an overhead product which is very rich in methyl borate and a bottom product which is comprised of boric acid.

Our improved process is carried out by mixing and reacting trimethoxyboroxine with a methyl borate-methanol mixture, such as methyl borate-methanol azeotrope. Equation 1 below exemplifies the reaction using the methyl borate-methanol azeotrope as the starting mixture:

(1) $3[B(OCH_3)_3 \cdot CH_3OH] + B_3O_3(OCH_3)_3 \rightarrow 5B(OCH_3)_3 + H_3BO_3$ The reaction mixture thereby produced is then distilled at reduced pressure; producing an overhead product which is comprised of about 90 to 92 wt. percent methyl borate, 7 to 10 wt. percent methanol and 0 to 2 wt. percent boric acid. The bottoms from the distillation comprise boric acid in a liquor composed of methanol, methyl borate and trimethoxyboroxine. In continuous operation this boric acid can be recovered from the bottoms and the liquor recycled into the process.

Pure methyl borate is easily recovered from the overhead product by known methods, such as by extraction. However, because of the relatively small amount of methanol present, a simple distillation is easily carried out and produces pure methyl borate quickly and economically. The small amount of methanol present is removed as methyl borate azeotrope which also may be recycled. Since Equation 1 above reverses at the conditions at which such a distillation of the enriched overhead product is carried out, the boric acid, if any is present, is recovered as trimethoxyboroxine, which also may be recycled. Thus, pure methyl borate is produced in an efficient manner.

The pressure at which the distillation of the reaction mixture is to be carried out should not exceed about 200 millimeters of mercury pressure in order for the process to proceed efficiently and to produce the overhead product of the composition described above. In practice pressures between about 100 and 200 millimeters are sufficient and are preferred. The temperature at which this distillation is carried out varies with the pressure; at about 100 millimeters pressure the temperature is about 24° C. while at 200 millimeters the temperature is about 51° C.

A detailed example of our method and invention is set forth below; this example is to be taken as illustrative only and is not to be construed as limiting the invention to its details.

A mixture composed of 528 grams of methyl borate and 258 grams of methanol was reacted with 467 grams of trimethoxyboroxine in a reaction vessel which was stirred to prevent settling of the insoluble boric acid formed. The reaction mixture was then charged into a vacuum evaporator which was operated at 100 millimeters of mercury pressure by a means of a steam aspirator. The temperature in the vacuum evaporator was 24° C. The overhead product obtained from this distillation was composed of 795.2 grams of methyl borate, 65.9 grams of methanol and 12.4 grams of boric acid. This overhead product was then distilled and 345.2 grams of methyl borate-methanol azeotrope (composed of 260.1 grams of methyl borate and 85.1 grams of methanol) was recovered along with 495.1 grams of pure product methyl borate. A small amount of trimethoxyboroxine (33.2 grams) was also recovered and was recycled. The bottoms product from the vacuum evaporator was composed of 149.4 grams of methyl borate, 119.6 grams of trimethoxyboroxine and 111 grams of boric acid. These bottoms were filtered to recover the boric acid and then were recycled back into the vacuum evaporator along with further reaction mixture. Similarly, the methyl borate-methanol azeotrope recovered from the distillation of the overhead product was also recycled and was reacted with additional trimethoxyboroxine.

The ratio of trimethoxyboroxine to methyl borate-methanol mixture is not critical and need not be controlled so as to produce precipitation of boric acid. However, it is preferred to use stoichiometric quantities in accordance with Equation 1 above. That is, when methyl borate-methanol azeotrope having a 1 to 1 molar proportion of methanol and methyl borate is used it is preferred to use one mole of trimethoxyboroxine for each three mols of methanol and methyl borate.

In these and other tests, it was shown that by carrying out the above reaction in the manner described above, using pressures between 100 and 200 millimeters in the vacuum distillation step and recycling the intermediate products as indicated, 80 to 90 wt. percent of the feed trimethoxyboroxine and methyl borate-methanol mixture is recovered as methyl borate and 10 to 20 wt. percent as boric acid.

According to the provisions of the patent statutes, we have described the principle and mode of practicing our invention and have described what we now consider to be its best embodiments. However, we desire to have it understood that, within the scope of the appended claims, the invention may be practiced otherwise than as specifically described.

We claim:

1. A method of recovering methyl borate which comprises reacting trimethoxyboroxine with a methyl borate-methanol mixture, distilling the reaction mixture at not greater than about 200 millimeters of mercury pressure, and recovering methyl borate from the overhead product of the distillation.

2. A method in accordance with claim 1 in which the methyl borate-methanol mixture is methyl borate-methanol azeotrope.

3. A method in accordance with claim 2 in which about one mol of trimethoxyboroxine is used for each three mols of methyl borate-methanol azeotrope.

4. A method in accordance with claim 1 in which the pressure is between about 100 to 200 millimeters.

5. A method of recovering methyl borate which comprises reacting trimethoxyboroxine with a methyl borate-methanol mixture, vacuum distilling the reaction mixture thus produced at a pressure not greater than about 200 millimeters of mercury whereby a volatile portion and a non-volatile portion are produced, distilling the said volatile portion to separate methyl boroate-methanol azeotrope and recover pure methyl borate, and returning said methyl borate-methanol azeotrope and said non-volatile portion for reuse in the process.

6. A method in accordance with claim 5 in which the methanol methyl borate mixture is methyl borate-methanol azeotrope.

7. A method in accordance with claim 6 in which about 1 mol of trimethoxyboroxine is used for each 3 mols of methyl borate-methanol azeotrope.

8. A method in accordance with claim 5 in which the pressure is between about 100 to 200 millimeters.

References Cited in the file of this patent
UNITED STATES PATENTS 2,217,354     Appel ------------------ Oct. 8, 1940

OTHER REFERENCES

Webster et al.: J. Amer. Chem. Soc., vol. 55, pp. 3253–5 (1933).

Lappert: J. Chem. Soc. (London), pp. 3256–9 (1958).